United States

4,012,119

Adams et al.

Mar. 15, 1977

[54] DIRECT CURRENT LIQUID CRYSTAL DISPLAY WITH HIGHLY REFLECTING DIELECTRIC MIRROR

[75] Inventors: James E. Adams, Webster; Gary A. Dir, Fairport, both of N.Y.

[73] Assignee: Xerox Corporation, Stamford, Conn.

[22] Filed: Dec. 12, 1975

[21] Appl. No.: 640,081

[52] U.S. Cl. .......................... 350/160 LC; 350/164
[51] Int. Cl.² .......................................... G02F 1/13
[58] Field of Search ........... 350/160 LC, 164, 166, 350/288

[56] References Cited
UNITED STATES PATENTS

| | | | |
|---|---|---|---|
| 3,736,047 | 5/1973 | Gelber et al. ............... | 350/160 LC |
| 3,824,002 | 7/1974 | Beard ......................... | 350/160 LC |
| 3,846,014 | 11/1974 | Aldrich et al. ............. | 350/160 LC |
| 3,853,386 | 12/1974 | Ritter et al. ................ | 350/164 |
| 3,910,681 | 10/1975 | Elliott et al. ............... | 350/160 LC |

*Primary Examiner*—Edward S. Bauer
*Attorney, Agent, or Firm*—James J. Ralabate; Richard A. Tomlin; George J. Cannon

[57] ABSTRACT

A direct current liquid crystal display device for reflection viewing comprises a dielectric mirror having at least one pair of titanium dioxide and silicon dioxide layers, the titanium dioxide layer being in contact with a layer of liquid crystalline composition, between two electrodes.

10 Claims, 2 Drawing Figures

DIRECT CURRENT LIQUID CRYSTAL DISPLAY WITH HIGHLY REFLECTING DIELECTRIC MIRROR

BACKGROUND OF THE INVENTION

This invention relates to liquid crystal display devices viewed in reflection, and, more particularly to a liquid crystal reflection display device in which direct current can be utilized with extended electro-optical lifetime for the liquid crystalline material.

Generally speaking, electro-optical systems employing liquid crystalline materials in contact with an electrode or a photoconductive layer enjoy a wide range of applications but have heretofore been limited in duration of operation and the electrode or photoconductive layer. This duration of lifetime has been particularly limited in cells having a photoconductive layer in contact with the liquid crystalline layer. Prior attempts to prevent or retard degradation of such devices have included the use of a barrier layer such as the cellulose nitrate barrier layer disclosed in U.S. Pat. No. 3,722,998; the polymer barrier layers disclosed in U.S. Pat. No. 3,795,516 and U.S. Pat. No. 3,795,517; the tributyltin oxide barrier layers disclosed in U.S. Pat. No. 3,894,794 and U.S. Pat. No. 3,894,793; and by silicon dioxide disclosed in U.S. Pat. No. 3,869,195, U.S. Pat. No. 3,674,342 and U.S. Pat. No. 3,647,280.

A layer of titanium dioxide is utilized in U.S. Pat. No. 3,748,018 to allow selective operation of a liquid crystal display in either the transmission or reflectance mode. Although a portion of the layer of titanium dioxide is in contact with the layer of liquid crystalline material at the terminal ends of the liquid crystal display, the titanium dioxide layer does not appear to be part of a dielectric mirror located between the electrode and the liquid crystal layer.

U.S. Pat. No. 3,853,386 discloses a low-loss highly reflective multi-layer system comprising alternate layers of high refraction and low refraction oxide layers wherein the at least last three high refraction layers comprise zirconium oxide. Otherwise, titanium dioxide and silicon dioxide are included in the alternate layer structure in addition to the zirconium oxide layers; however, the titanium dioxide layer is the first layer on the substrate in the alternate layer structure so that without the zirconium oxide layer as the terminal layer, the silicon dioxide layer would be in contact with any imaging layer were the dielectric mirror thus modified inserted into a display device.

Jacobson et al in an article entitled "A Real-Time Optical Data Processing Device", beginning at page 17 of the September, 1975 issue of *Information Display*, disclose an alternating current photoactivated liquid crystal light valve incorporating a dielectric mirror consisting of alternate quarter wavelength films is insulating, direct current can not occur. Furthermore, sputter-deposited films of silicon dioxide overcoat the dielectric mirror to provide an alignment function and a buffer to prevent electro-optical degradation.

In new and growing areas of technology such as liquid crystal imaging, new methods, apparatus, compositions, and articles of manufacture are often discovered for the application of the new technology in a new mode. The present invention relates to a novel liquid crystal display device for extending the electro-optical lifetime of liquid crystal layers utilized therein.

SUMMARY OF THE INVENTION

It is, therefore, an object of this invention to provide a novel reflection viewing direct current liquid crystal display device.

It is a further object of this invention to provide a novel liquid crystal display device having extended electrooptical lifetime under application of DC voltages.

The foregoing objects and others are accomplished in accordance with this invention by providing between two electrodes in a liquid crystal device, a dielectric mirror comprising one or more pairs of titanium dioxide and silicon dioxide layers, each layer having a quarter wave optical thickness of multiples thereof, the dielectric mirror being of a thickness effective for conducting electrical charge, the layer of titanium dioxide being in contact with a layer of liquid crystalline composition.

Another object of the invention is to provide a substantially increased reflection efficiency.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein:

FIG. 1 illustrates an embodiment of the invention wherein the dielectric mirror comprising silicon dioxide and titanium dioxide layers is sandwiched between the liquid crystal layer 4 and electrode 2. FIG. 2 schematically illustrates the embodiment of the liquid crystal display device incorporating a photoconductive layer. In FIG. 2 the dielectric mirror comprising silicon dioxide and titanium dioxide layers separates photoconductive layer 7 and liquid crystal layer 4.

Electrodes 2 and 5 are provided on substrates 1 and 6 and can comprise any suitably electrically conductive material. Typical suitable electrically conductive materials include gold, indium oxide, tin oxide, silver and other conductors. Typical suitable substrates include glass, plastic, papers, ceramics, and other insulators. An example of a conductively coated insulator is NESA glass available from Pittsburgh Plate Glass Company.

Liquid crystal layer 4 may comprise any liquid crystalline material which undergoes an optical property change upon application of voltage between electrodes 2 and 5. For example, nematic liquid crystalline materials exhibiting dynamic scattering such as Dynamic Scattering Mixture No. 11643, available from Eastman Kodak Company; cholesteric liquid crystal materials and mixtures thereof, such as, for example cholesteryl chloride, cholesteryl nonanoate, cholesteryl oleyl carbonate; non-mesomorphic optically active materials such as, for example, 1-menthol, d-mannitol and 1-methone mixed with nematic liquid crystalline materials; or mixtures thereof. U.S. Pat. No. 3,894,794 is hereby incorporated by reference for a more complete listing of the various nematic, cholesteric, non-mesomorphic optically active materials and mixtures thereof.

Mixtures of the nematic liquid crystalline material and the optically active, non-mesomorphic material can be prepared in organic solvents such as chloroform, petroleum ether, methyl-ethyl ketone and the like, which are typically subsequently evaporated from the mixture thereby leaving the liquid crystalline composition. Alternatively, the individual components of the liquid crystalline composition can be combined directly by heating the mixed components to a temperature which is above the isotropic transition temperature of the nematic liquid crystalline substance and the melting point of the non-mesomorphic material.

Figure 2:
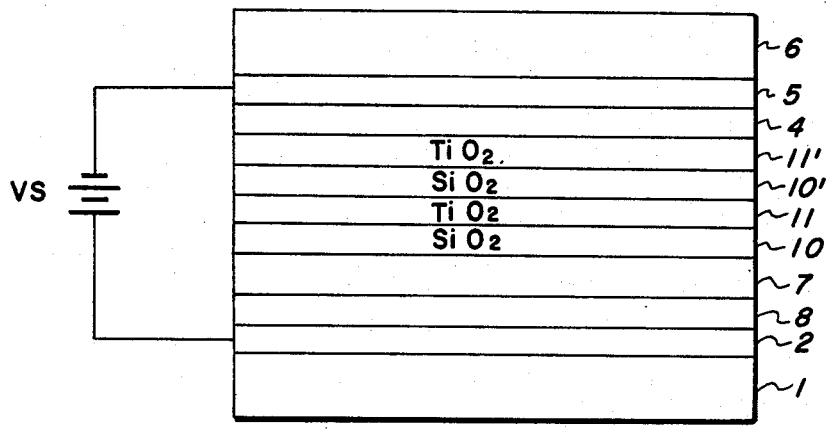
FIG. 2 is a partially schematic, cross-sectional view of a second embodiment of the present invention.

In embodiments of the present invention where optical input is desired to be provided in imagewise configuration in order to alter the voltage applied across the liquid crystalline composition, a photoconductive layer 7 is included in the electro-optical system between the liquid crystalline composition and the conductive coating of one of the electrodes as shown in FIG. 2. The dielectric mirror is provided between the liquid crystalline composition and the photoconductive layer.

Typical suitable photoconductive materials include photoconductive inorganic materials and photoconductive organic materials. Typical suitable inorganic photoconductive materials include sensitized zinc oxide, for example, sensitized by the addition of Rhodamine Dye, available from Dupont; selenium, selenium alloyed with arsenic such as, for example, arsenic triselenide, tellurium, antimony, or bismuth; cadmium sulfide, cadmium sulfoselenide, and the many other typical suitable inorganic photoconductive materials listed in U.S. Pat. No. 3,121,006 to Middleton et al and listed in U.S. Pat. No. 3,288,603, both of which patents are hereby incorporated by reference. Typical suitable organic photoconductive materials include, for example, the combination of 2,5-bis(p-aminophenyl)-1,3,4-oxadiazole, available under the trademark TO 1920 from Kalle and Company, Weisbaden-Biebrich, Germany and Vinylite VYNS, a copolymer of vinyl chloride and vinyl acetate, available from Carbide and Carbon Chemicals Company; and the combination of 2,4,7-trinitro-9-fluorenone to polyvinylcarbazole, available under the trademark Luvican 170 from Winter, Wolf and Company, New York, N.Y. The thickness of the photoconductive layer is not critical to the practice of the invention. Typical suitable thicknesses are from about 1 to about 100 microns.

It will be appreciated, of course, that the optical input includes a wavelength of radiation which is actinic to the photoconductive material. That is, the wavelength of radiation is within the fundamental absorption band of the photoconductive material utilized.

Figure 1:
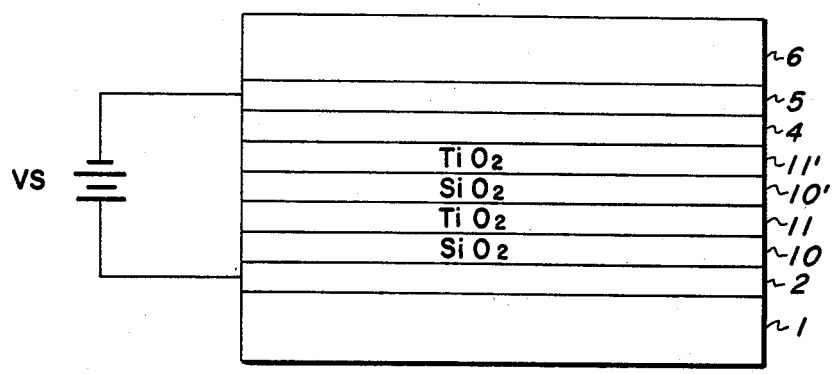
FIG. 1 is a partially schematic, cross-sectional view of a preferred embodiment of the present invention.

To provide the layers of titanium dioxide and silicon dioxide in the embodiments of FIG. 1, the titanium and silicon dioxide are vacuum evaporated by electron beam techniques. That is, the electron beam bombards the sample in a boat in the vacuum evaporation chamber to provide the energy required for evaporation. High energy electron beams between about 3 to about 10 Kev are utilized.

To provide layers of titanium dioxide and silicon dioxide in the embodiments depicted in FIG. 2, the dioxides are vacuum evaporated by the same electron beam techniques. In all embodiments, it has been found that the layer of titanium dioxide resulting from the vacuum evaporation techniques is desirably harder and has greater adherence to the substrate upon which it is applied, when that substrate is maintained at an elevated temperature during vacuum evaporation. A temperature of from 175° C to about 250° C is employed.

It has been found desirable in fabricating the FIG. 2 embodiment to ensure that the photoconductive material in photoconductive layer 7 is capable of being subjected to a temperature of 175° C to about 250° C during vacuum evaporation of the titanium dioxide. For example, it has been found that an interfacial layer 8 of zinc sulfide inserted between electrode 2 and photoconductive layer 7 is desirable when photoconductive layer 7 is arsenic triselenide.

The following examples further specifically describe the best mode of the preferred embodiments of the present invention. Parts and percentages are by weight unless otherwise noted.

EXAMPLE I

An electro-optic system comprising a photoconductive layer is prepared as follows: two electrodes are prepared by coating glass plates of about 2 × 2 × ¼ inch with indium oxide conductive coatings; on one of the indium oxide coatings an about 1000A thick layer of zinc sulfide is vacuum evaporated by conventional techniques. Upon the zinc sulfide layer, an about 7 micron thick photoconductive layer of arsenic triselenide is vacuum evaporated. Upon the layer of arsenic triselenide four alternating layers of silicon dioxide and titanium dioxide (about 893A thick layers of silicon dioxide and about 521A thick layers of titanium dioxide) are vacuum evaporated by electron beam bombardment at about 7 Kev while maintaining the arsenic triselenide at about 175° C. Then, an about ½ mil thick Tedlar spacer is placed atop the titanium dioxide layer and has a void cross-section of about 6 cm². A liquid crystalline composition comprising about 75 percent Dynamic Scattering Mixture *No. 11643 available from Eastman Kodak Company, and about 25 percent cholesteryl oleyl carbonate is prepared by simple mixing. The resulting composition is heated to the isotropic transition temperature of about 100° C and then poured into the spacer void and is in contact with the titanium dioxide layer. The second electrode is placed over the spacer, with its indium oxide coating in contact with the liquid crystalline composition. The embodiment schematically illustrated in FIG. 2 is thereby provided.

*Name: Nematic Mixture, Dynamic Scattering. 1
Typical Lot Data: Nematic range: 9° to 99° C; Dielectric anisotropy (at 0.05 $V_{pp}$, 1.0 KHz, 25° C):
$\epsilon_{\perp} / \epsilon_{\parallel} = 1.32$
$\epsilon_{\parallel} - \epsilon_{\perp} = -1.65$
Resistivity (at 35.4 $V_{rms}$, 500 Hz, 23° C):2.9 × 10⁹ ohm-cm
Threshold voltage: 8.1 $V_{rms}$ (60 Hz sine wave)
Initial transmission: 80% (homogeneous alignment).

The indium oxide coating is electrically connected to a variable voltage source. Imaging is conducted by applying about 75 volts D.C. and directing imagewise configured radiation of about 4850A wavelength at an intensity of about 50 ergs/sec for about 1.3 seconds upon the photoconductive layer. Erasure is had by applying 400 volts peak to peak A.C. at a frequency of 2 KHz for about 2 seconds.

An electro-optical lifetime of at least about 500,000 imaging cycles is obtained before image quality degradation. Optical frequency of 50% is exhibited. Contrast is 20:1 and reflectivity in air is about 75%. The reflection bandwidth is about 2000A centered about 5000A.

EXAMPLE II

Example I is repeated except that the four alternating layers of silicon dioxide and titanium dioxide are omitted. The electro-optical lifetime is only about 20,000 imaging cycles. The optical efficiency is about 10% and the contrast is about 10:1.

The reflection bandwidth, generally speaking, is a function of the ratio of refractive indices and as more quarter wave layers of silicon dioxide and titanium dioxide are added, the reflection bandwidth decreases and the reflectivity increases. The four alternating layers of silicon dioxide and titanium dioxide depicted in FIGS. 1 and 2 are preferred. The reflection bandwidth is approximately 2000A and is centered about a center wavelength, λ, of about 5000A. This reflection bandwidth is ideally suitable for reflection viewing with the aid of visible light. Also, the four alternating layer embodiment provides reflected light which is somewhat rich in the red portion of the electromagnetic spectrum and this gives the device a pleasant gold appearance. However, the benefits of extended electro-optical lifetime in a direct current liquid crystal display device utilizing a dielectric mirror, can be provided by utilizing only one pair of silicon dioxide and titanium dioxide layers. Moreover, these benefits are provided when more than one or two pair of silicon dioxide and titanium dioxide layers are employed. Three, four, five and greater pairs of silicon dioxide and titanium dioxide layers will work.

With respect to the thickness of each of the silicon dioxide and titanium dioxide layers in each pair of layers, the optical thickness, $nt$, where $n$ is the index of refraction and $t$ is the physical layer thickness, is equal to $[(2m + 1)/4]\lambda$, where $m$ is zero or a positive whole number and where $\lambda$ is the center wavelength of the reflection bandwidth utilized for reflection viewing. That is, the optical thickness of each of the silicon dioxide and titanium dioxide layers in the dielectric mirror is a multiple of the center wavelength of the reflection band.

Further, each particular layer of silicon dioxide and titanium dioxide need not be the same thickness as any other silicon dioxide or titanium dioxide layer, so long as its optical thickness is a multiple of the expression $[(m + 1)/4]\lambda$.

The total thickness limitation of the dielectric mirror, utilized herein, regardless of the number of pairs of silicon dioxide and titanium dioxide layers, has a total thickness effective for conducting direct current. Any total dielectric mirror thickness which permits the transportation of charge therethrough can be utilized in the practice of the present invention. Typical suitable total dielectric mirror thicknesses are from about 1300 A to about 20,000A.

It will be appreciated that other variations and modifications will occur to those skilled in the art upon a reading of the present disclosure. These are intended to be within the scope of the invention.

The ability to use D.C. which is provided by the invention is particularly significant in display devices and systems where a sensitive photoconductor is to be employed. For example, where liquid crystal displays are to be read in from a CRT, the use of a photoconductor in the display devices requires that the photoconductor have high sensitivity. The mobilities of the photoconductors are such that the photoconductor transports charge only in one direction and therefore requires the use of D.C.

What is claimed is:

1. A liquid crystal display for reflection viewing of a direct current electro-optic change in a liquid crystal layer by a reflection bandwidth having a center wavelength, λ, comprising: between two electrodes a layer of liquid crystalline composition in contact with a dielectric mirror; said dielectric mirror having a thickness effective for conducting direct current and comprising at least one pair of titanium dioxide and silicon dioxide layers, each layer having an optical thickness of $nt = [(m + 1)/4]\lambda$ where $n$ is the index of refraction, $t$ is the layer thickness and $m$ is selected from the group consisting of 0 and positive whole numbers; said layer of titanium dioxide being in contact with said layer of liquid crystalline composition.

2. The display of claim 1 further including a photoconductive layer between said layer of silicon dioxide and one of said electrodes.

3. The display of claim 2 wherein said photoconductive layer comprises arsenic triselenide, further including a layer of zinc sulfide sandwiched between said photoconductive layer and said one of said electrodes.

4. The display of claim 3 wherein said dielectric mirror comprises a plurality of pairs of titanium dioxide and silicon dioxide layers, all but one of said silicon dioxide layers being sandwiched between two titanium dioxide layers, said one silicon dioxide layer being sandwiched between a titanium dioxide layer and said photoconductor.

5. The display of claim 4 wherein at least one of said silicon dioxide layers has a thickness of about 893A and at least one of said titanium dioxide layers has a thickness of about 521A.

6. The display of claim 4 wherein said dielectric mirror comprises two pair of silicon dioxide and titanium dioxide layers.

7. The display of claim 3 wherein said photoconductor layer has a thickness of about 7 microns and said zinc sulfide layer has a thickness of about 1000A.

8. The display of claim 1 wherein the thickness of said dielectric mirror is from about 1300A to about 20,000A.

9. The display of claim 1 wherein λ has a value of about 5000A.

10. The diplay of claim 1 further including a DC voltage source in electrical connection with said electrodes.

* * * * *